(12) United States Patent
Son et al.

(10) Patent No.: US 12,592,151 B2
(45) Date of Patent: Mar. 31, 2026

(54) SYSTEM AND METHOD FOR MULTI-IMAGE-BASED VESSEL PROXIMITY SITUATION RECOGNITION SUPPORT

(71) Applicant: KOREA INSTITUTE OF OCEAN SCIENCE & TECHNOLOGY, Busan (KR)

(72) Inventors: NamSun Son, Sejong (KR); ChunSeon Pyo, Daejeon (KR); HanSol Park, Ansan-si (KR)

(73) Assignee: Korea Institute of Ocean Science & Technology, Busan (KR)

( * ) Notice: Subject to any disclaimer, the term of this patent is extended or adjusted under 35 U.S.C. 154(b) by 264 days.

(21) Appl. No.: 18/059,102

(22) Filed: Nov. 28, 2022

(65) Prior Publication Data

US 2023/0169872 A1 Jun. 1, 2023

(30) Foreign Application Priority Data

Nov. 29, 2021 (KR) ........................ 10-2021-0167292

(51) Int. Cl.
*G08G 3/02* (2006.01)
*B63B 79/00* (2020.01)
(Continued)

(52) U.S. Cl.
CPC .............. *G08G 3/02* (2013.01); *B63B 79/00* (2020.01); *B63B 79/40* (2020.01);
(Continued)

(58) Field of Classification Search
CPC .......... G08G 3/02; B63B 79/00; B63B 79/40; B63B 49/00; B63B 43/18;
(Continued)

(56) References Cited

U.S. PATENT DOCUMENTS

2005/0124234 A1* 6/2005 Sells ...................... B63H 25/02
440/33
2012/0265380 A1* 10/2012 Kuwata ................ G05D 1/0206
701/21
(Continued)

FOREIGN PATENT DOCUMENTS

KR 10-0734814 B1 7/2007
KR 10-1823029 B1 1/2018
(Continued)

*Primary Examiner* — Anne Marie Antonucci
*Assistant Examiner* — Luis G Del Valle
(74) *Attorney, Agent, or Firm* — Knobbe, Martens, Olson & Bear, LLP

(57) ABSTRACT

A system and method for multi-image-based vessel proximity situation recognition support is proposed. The system may include an unmanned surface vehicle (USV) configured to detect and track surrounding objects by monitoring surroundings using surrounding images and navigation sensors. The system may also include a remote navigation controller configured to support proximity situation recognition of the unmanned surface vehicle according to detection of the surrounding objects, wherein the unmanned surface vehicle may include an image acquisition processor, a navigation sensor, and a detector.

5 Claims, 6 Drawing Sheets

(51) Int. Cl.

| | | |
|---|---|---|
| *B63B 79/40* | (2020.01) | |
| *G01C 21/16* | (2006.01) | |
| *G05D 1/00* | (2024.01) | |
| *G06V 10/12* | (2022.01) | |
| *G06V 20/58* | (2022.01) | |

(52) U.S. Cl.
CPC ..... *G01C 21/1652* (2020.08); *G01C 21/1656* (2020.08); *G05D 1/0038* (2013.01); *G06V 10/12* (2022.01); *G06V 20/58* (2022.01)

(58) Field of Classification Search
CPC ........ B63B 2035/007; B63B 2035/008; G01C 21/1652; G01C 21/1656; G05D 1/0038; G05D 1/0206; G06V 10/12; G06V 20/58

See application file for complete search history.

(56) References Cited

U.S. PATENT DOCUMENTS

| | | | | |
|---|---|---|---|---|
| 2015/0277442 | A1* | 10/2015 | Ballou | G05D 1/0027 |
| | | | | 701/2 |
| 2016/0041255 | A1* | 2/2016 | Berumen | A01K 61/90 |
| | | | | 701/2 |
| 2019/0031300 | A1* | 1/2019 | Bangslund | B63B 35/00 |
| 2020/0369351 | A1* | 11/2020 | Behrendt | G06V 20/00 |
| 2021/0101664 | A1* | 4/2021 | Nedwed | H04W 4/38 |
| 2021/0276189 | A1* | 9/2021 | Silverstein | B25J 11/00 |
| 2021/0318682 | A1* | 10/2021 | Hanson | B63B 1/042 |
| 2022/0197281 | A1* | 6/2022 | Chen | G05D 1/0206 |
| 2023/0020142 | A1* | 1/2023 | Chevalier | G05D 1/0088 |

FOREIGN PATENT DOCUMENTS

| | | | |
|---|---|---|---|
| KR | 10-1882483 | B1 | 7/2018 |
| KR | 10-2021-0054708 | A | 5/2021 |
| KR | 10-2455565 | B1 | 10/2022 |

* cited by examiner

100

200

USV onshore
control center

SYSTEM AND METHOD FOR MULTI-IMAGE-BASED VESSEL PROXIMITY SITUATION RECOGNITION SUPPORT

CROSS REFERENCE TO RELATED APPLICATION

The present application claims priority to Korean Patent Application No. 10-2021-0167292, filed Nov. 29, 2021, the entire contents of which is incorporated herein for all purposes by this reference.

BACKGROUND

Technical Field

The present disclosure relates to a system and method for multi-image-based vessel proximity situation recognition support.

Description of Related Technology

An unmanned ship is a ship that automatically navigates a set route without a crew member, and refers to a vessel whose navigation and engine parts (e.g. engine, rudder) can be controlled from a remote control center, if necessary. To this end, a remote control center is needed on shore to control the unmanned ship remotely, and a qualified person must directly conduct command and control at the remote control center in order to resolve technical and legal issues.

SUMMARY

One aspect is a system and method for multi-image-based vessel proximity situation recognition support that detects obstacles around an unmanned surface vehicle (USV) using multiple cameras and various navigation sensors mounted on the USV, and provides remote situational awareness information regarding the risk of collision with the detected obstacles.

Another aspect is a system for multi-image-based vessel proximity situation recognition support.

In some embodiments, the system includes: an unmanned surface vehicle (USV) configured to detect and track surrounding objects by monitoring surroundings using surrounding images and navigation sensors; and a remote navigation control device configured to support proximity situation recognition of the unmanned surface vehicle according to detection of the surrounding objects, wherein the unmanned surface vehicle may include: an image acquisition unit configured to acquire multiple images showing the surroundings of the unmanned surface vehicle to detect objects around the unmanned surface vehicle through image analysis; a navigation sensor unit configured to acquire current navigation information of the unmanned surface vehicle and information on obstacles around the unmanned surface vehicle in real time; and a detection unit configured to monitor the surroundings of the unmanned surface vehicle by using the multiple images, current navigation information, and information on obstacles and, when an object close to the unmanned surface vehicle within a preset distance is detected as a result of monitoring, track the object detected.

The image acquisition unit may include: a thermal imaging camera, a panoramic camera, and a 360-degree camera installed to photograph the surroundings of the unmanned surface vehicle, and acquires the multiple images including thermal images, panoramic images; and 360-degree images of the surroundings of the unmanned surface vehicle in a form of Around View (AV).

The navigation sensor unit may include: a global positioning system (GPS), a gyro sensor, an automatic identification system (AIS), and RADAR, wherein the GPS and gyro sensor may obtain the current navigation information including location, speed, direction, and posture of the unmanned surface vehicle, while the AIS and RADAR may obtain the information on obstacles around the unmanned surface vehicle.

The remote navigation control device may include: an estimation unit configured to estimate a collision risk between the unmanned surface vehicle and the object detected by using the multiple images, current navigation information, and information on obstacles; and a situation recognition unit configured to display the collision risk estimated, along with the object detected, on an electronic navigational chart for each detected object and to output the collision risk in order to support proximity situation recognition.

The estimation unit may determine whether the object detected is located on an expected path of the unmanned surface vehicle by using the current navigation information, and when it is determined that the object detected is located on the expected path, may calculate the collision risk between the unmanned surface vehicle and the object detected, by using fuzzy inference.

The situation recognition unit may display the collision risk for the object detected in an augmented reality (AR) or virtual reality (VR) screen based on the multiple images and may output the screen in order to support the proximity situation recognition.

Another aspect is a method for multi-image-based vessel proximity situation recognition support performed in a system including an unmanned surface vehicle and a remote navigation control device.

In some embodiments, the method may include: acquiring, by the unmanned surface vehicle, multiple images of surroundings to detect surrounding objects through image analysis; obtaining, by the unmanned surface vehicle, current navigation information and information on surrounding obstacles in real time; monitoring, by the unmanned surface vehicle, the surroundings using the multiple images, current navigation information, and information on surrounding obstacles and, when an object close to a surrounding area within a preset distance is detected as a result of monitoring, tracking the object detected; and supporting, by the remote navigation control device, proximity situation recognition of the unmanned surface vehicle according to detection of the object.

As described above, a system and method for multi-image-based vessel proximity situation recognition support according to an embodiment of the present disclosure has an effect that collision accidents with ships and obstacles in proximity can be prevented in advance during remote operation of an unmanned surface vehicle (USV) by detecting obstacles around the unmanned surface vehicle using multiple cameras and various navigation sensors mounted on the unmanned surface vehicle, and providing remote situational awareness information regarding the risk of collision with the detected obstacles.

BRIEF DESCRIPTION OF THE DRAWINGS

The above and other objectives, features, and other advantages of the present disclosure will be more clearly understood from the following detailed description when taken in conjunction with the accompanying drawings.

DETAILED DESCRIPTION

Due to the recent development of GPS and a variety of sensors, it is not difficult for a vehicle to autonomously drive on the shortest route, but it is not so in the case of ship navigation. This is because, unlike land-based vehicles, such as cars and motorcycles, ships have very large inertial forces due to the nature of being operated on water, and thus it is very difficult for ships to instantly adjust their speed or direction. In addition, the reality is that it is very difficult to navigate on a scheduled route at sea because the sea does not have a fixed road like on land and is greatly affected by multiple variables such as weather. Moreover, crew members should always look ahead to prevent unexpected collisions with other ships and reefs.

Particularly, in case of heavy rain or snow, high concentration of fog, smog, yellow dust or fine dust during ship operation, visibility is rapidly reduced, making it difficult for the crew members to detect objects with the naked eye even if they look ahead. Consequently, the ship and its crew members may be put in very dangerous situations where they may collide with other ships and reefs unexpectedly, which is problematic. In other words, when it comes to ship navigation, collision avoidance is essential, and in order to adjust the speed or direction of a ship, it is necessary to predict the ship's navigation path in advance and operate a steering wheel or shift lever in advance.

As used herein, the singular expression includes the plural expression unless the context clearly dictates otherwise. In this specification, terms such as "comprise", "include", or "have" should not be construed as necessarily including all of the various components or steps described in the specification, but should be construed that some of the components or steps may not be included, or may further include additional components or steps. In addition, terms such as ". . . unit", ". . . part", and "module" described in the specification mean a unit that processes at least one function or operation, which may be implemented as hardware or software or a combination thereof.

Hereinafter, various embodiments of the present invention will be described in detail with reference to the accompanying drawings.

Figure 1:
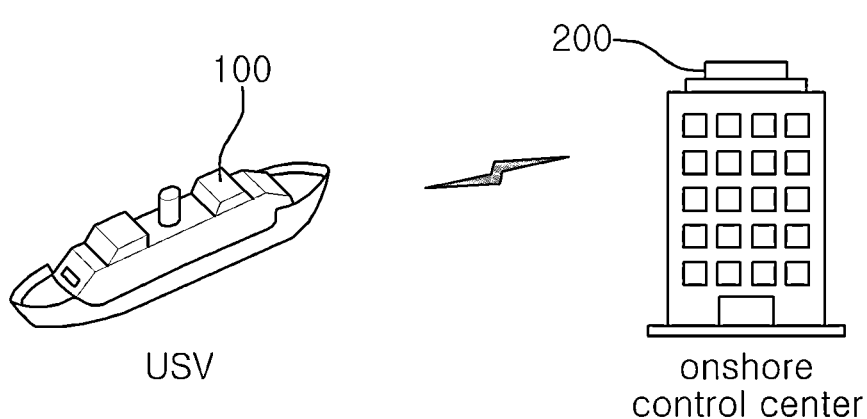
FIG. 1 is a view schematically illustrating an environment in which a system and method for multi-image-based vessel proximity situation recognition support according to an embodiment of the present disclosure may be implemented.
Figure 2:
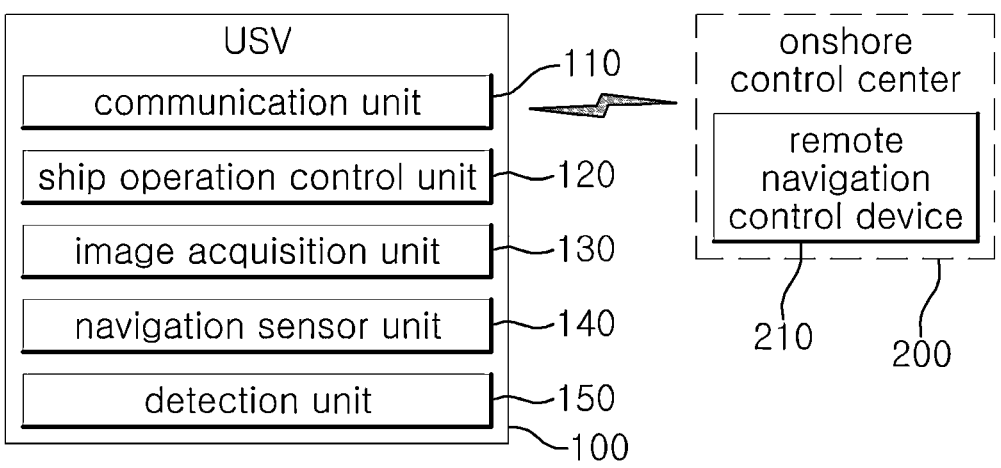
FIGS. 2 and 3 are views schematically illustrating the configuration of the system and method for multi-image-based vessel proximity situation recognition support according to the embodiment of the present disclosure.
Figure 3:
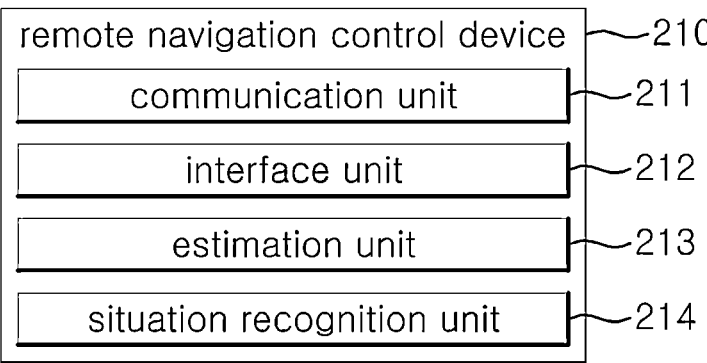
Figure 4:
FIGS. 4 and 5 are views illustrating the system and method for multi-image-based vessel proximity situation recognition support according to the embodiment of the present disclosure.
Figure 5:
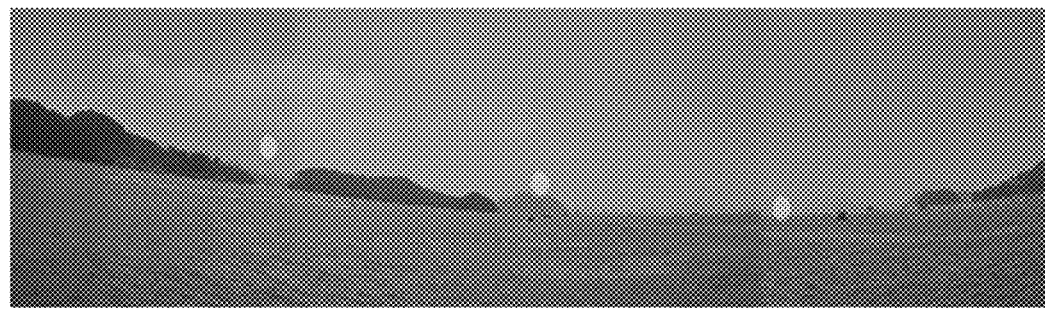

FIG. 1 is a view schematically illustrating an environment in which a system and method for multi-image-based vessel proximity situation recognition support according to an embodiment of the present disclosure may be implemented, FIGS. 2 and 3 are views schematically illustrating the configuration of the system and method for multi-imagebased vessel proximity situation recognition support according to the embodiment of the present disclosure, and FIGS. 4 and 5 are views illustrating the system and method for multi-image-based vessel proximity situation recognition support according to the embodiment of the present disclosure. Hereinafter, with reference to FIGS. 1 to 5, the system for multi-image-based vessel proximity situation recognition support according to the embodiment of the present disclosure will be described.

Referring to FIG. 1, the system for multi-image-based vessel proximity situation recognition support according to the embodiment of the present disclosure may be implemented in an unmanned surface vehicle (USV) and an onshore control center 200.

For example, communication between the unmanned surface vehicle 100 and the onshore control center 200 may be performed through a marine communication network such as LTE-Maritime or a communication satellite.

Referring to FIG. 2, the system for multi-image-based vessel proximity situation recognition support according to the embodiment of the present disclosure may be configured to include a remote navigation control device (or a remote navigation controller) 210 installed in the unmanned surface vehicle 100 and the onshore control center 200.

The unmanned surface vehicle 100 detects and tracks surrounding objects by monitoring the surroundings using surrounding images and navigation sensors.

The remote navigation control device 210 supports the recognition of surrounding situations by the unmanned surface vehicle in line with the detection of surrounding objects.

As shown in FIG. 2, the unmanned surface vehicle 100 may include a communication unit 110, a ship operation control unit 120, an image acquisition unit (or an image acquisition processor) 130, a navigation sensor unit (or a navigation sensor) 140 and a detection unit (or a detector) 150.

The communication unit 110 communicates with other ships or land-based communicable devices. For example, the communication unit 110 may include various communication media such as CDMA, satellite communication, LTE, and RF communication.

In particular, the communication unit 110 may communicate with the remote navigation control device 210 installed in the onshore control center 200 that remotely supports navigation of ships.

The ship operation control unit 120 controls the operation of the unmanned surface vehicle 100 according to control commands and control information received from the remote navigation control device 210 in the onshore control center 200.

That is, the remote navigation control device 210 may receive control commands and control information from a user and transmit the received control commands and control information to the unmanned surface vehicle 100.

Meanwhile, the ship operation control unit 120 may have an autonomous navigation function.

For example, the ship operation control unit 120 may receive destination information, generate an optimal navigation route to the destination, and control the unmanned surface vehicle 100 to navigate according to the generated optimal navigation route. The ship operation control unit 120 may be implemented as software, hardware, or a combination thereof, and may include an electronic navigational chart database, a route algorithm for calculating an optimal navigation route, and the like.

In addition, the ship operation control unit 120 may control the speed and direction of the unmanned surface vehicle 100 by controlling the engine and steering gear of the unmanned surface vehicle 100. At this time, the ship operation control unit 120 may control the speed and direction of the unmanned surface vehicle 100 so that the unmanned surface vehicle 100 avoids surrounding ships or obstacles by utilizing the image acquisition unit 130 and the navigation sensor unit 140 to be described later to monitor the surrounding situations.

The image acquisition unit 130 acquires multiple images showing the surroundings of the unmanned surface vehicle 100 in order to detect objects around the unmanned surface vehicle 100 through image analysis.

That is, the image acquisition unit 130 may include a thermal imaging camera, a panoramic camera, and a 360-degree camera installed to photograph the surroundings of the unmanned surface vehicle 100. As such, the image acquisition unit 130 may acquire thermal images, panoramic images, and 360-degree images showing the surroundings of the unmanned surface vehicle 100 in the form of Around View (AV).

The navigation sensor unit 140 acquires current navigation information of the unmanned surface vehicle 100 and information about obstacles around the unmanned surface vehicle 100 in real time.

That is, the navigation sensor unit 140 may include a global positioning system (GPS), a gyro sensor, an automatic identification system (AIS), RADAR, LiDAR, and the like.

The GPS and gyro sensor may obtain current navigation information including the location, speed, direction, and posture of the unmanned surface vehicle 100.

The AIS, RADAR, and LiDAR may obtain information about obstacles around the unmanned surface vehicle 100. The obstacle information may include information on an unidentified object (obstacle) located around the unmanned surface vehicle 100 or a ship operating around the unmanned surface vehicle 100.

That is, the AIS receives and collects AIS data, which is the track data of ships around the unmanned surface vehicle 100. At this time, the AIS data consists of static date and dynamic data. The static date includes information on ship name, specifications, and destination while the dynamic data includes navigation information such as the current location, course, and speed of a ship.

The RADAR and LiDAR detect objects existing around the unmanned surface vehicle 100, and obtain location information, movement speed, movement direction, and shape information of the detected objects. At this time, the objects may include a ship sailing around the unmanned surface vehicle 100, an iceberg, a reef, a floating object, and the like.

By using the multiple images showing the surroundings of the unmanned surface vehicle 100, as well as obstacle information and current navigation information acquired by the image acquisition unit 110 and the navigation sensor unit 140, the detection unit 150 monitors the surroundings of the unmanned surface vehicle 100 and, when an object close to the unmanned surface vehicle 100 within a preset distance is detected as a result of monitoring, tracks the detected object.

At this time, the detection unit 150 may transmit the multiple-image information, obstacle information, and current navigation information acquired by the image acquisition unit 110 and the navigation sensor unit 140 to the remote navigation control device 210, and in case an object is detected, may also transmit information on the detected object to the remote navigation control device 210.

Referring to FIG. 3, the remote navigation control device 210 may be configured to include a communication unit 211, an interface unit 212, an estimation unit (or an estimation processor) 213 and a situation recognition unit (or a situation recognition processor) 214.

The communication unit 211 communicates with various ships in operation. For example, the communication unit 211 may include various communication media such as CDMA, satellite communication, LTE, and RF communication.

In particular, the communication unit 211 may communicate with the unmanned surface vehicle 100 that a remote operator wants to control through the remote navigation control device 210.

The interface unit 212 is a means for the remote operator in the onshore control center 200 to control the unmanned surface vehicle 100 located remotely.

For example, the interface unit 212 may include a display, a remote controller, and the like. The display may output the multiple images showing the surroundings of the unmanned surface vehicle 100, as well as obstacle information and current navigation information acquired by the image acquisition unit 110 and the navigation sensor unit 140 and received from the unmanned surface vehicle 100. In addition, the remote controller is a device for the remote operator to control the unmanned surface vehicle 100, and may receive various control commands for the unmanned surface vehicle 100 and transmit the received control commands to the unmanned surface vehicle 100.

The estimation unit 213 estimates a collision risk between the unmanned surface vehicle 100 and an object around the unmanned surface vehicle 100 detected by the detection unit 150 by using the multiple-image information, obstacle information, and current navigation information received from the unmanned surface vehicle 100.

For example, the estimation unit 213 may calculate the collision risk by using fuzzy inference.

That is, the estimation unit 213 may determine whether the detected object is located on the expected path of the unmanned surface vehicle 100 by using the current navigation information including the location, speed, direction, and posture of the unmanned surface vehicle 100 and, when it is determined that the detected object is located on the expected path, may calculate the collision risk between the unmanned surface vehicle 100 and the detected object, by using fuzzy inference.

In addition, as a result of tracking by the detection unit 150, when the detected object is identified as a moving object such as a ship, the estimation unit 213 may calculate the time when the detected object passes through the expected path of the unmanned surface vehicle 100, and calculate the collision risk between the unmanned surface vehicle 100 and the detected object at the time of passing through the calculated predicted path by the detected object, by using fuzzy inference.

The situation recognition unit 214 displays the collision risk calculated by the estimation unit 213 through the display of the interface unit 212 along with the detected object on an electronic navigational chart for each detected object and outputs the displayed collision risk in order to support the remote operator's awareness of the surrounding situations of the unmanned surface vehicle 100.

In addition, the situation recognition unit 214 may display the calculated collision risk for the detected object in an augmented reality (AR) or virtual reality (VR) screen based on the multiple images showing the surroundings of the unmanned surface vehicle 100 and output the screen in order to support the remote operator's awareness of the surrounding situations of the unmanned surface vehicle 100.

For example, as shown in FIGS. 4 and 5, on the augmented reality or virtual reality-based surrounding situation recognition support screen that is output, detected objects are highlighted to increase their visibility, and among the detected objects, the one with a high risk of collision due to close proximity to the unmanned surface vehicle 100 may be displayed with a sign indicating the danger. FIG. 4 shows an augmented reality and virtual reality-based surrounding situation recognition support screen using 360-degree images, and FIG. 5 shows an augmented reality-based proximity situation recognition support screen using a panoramic image.

Figure 6:
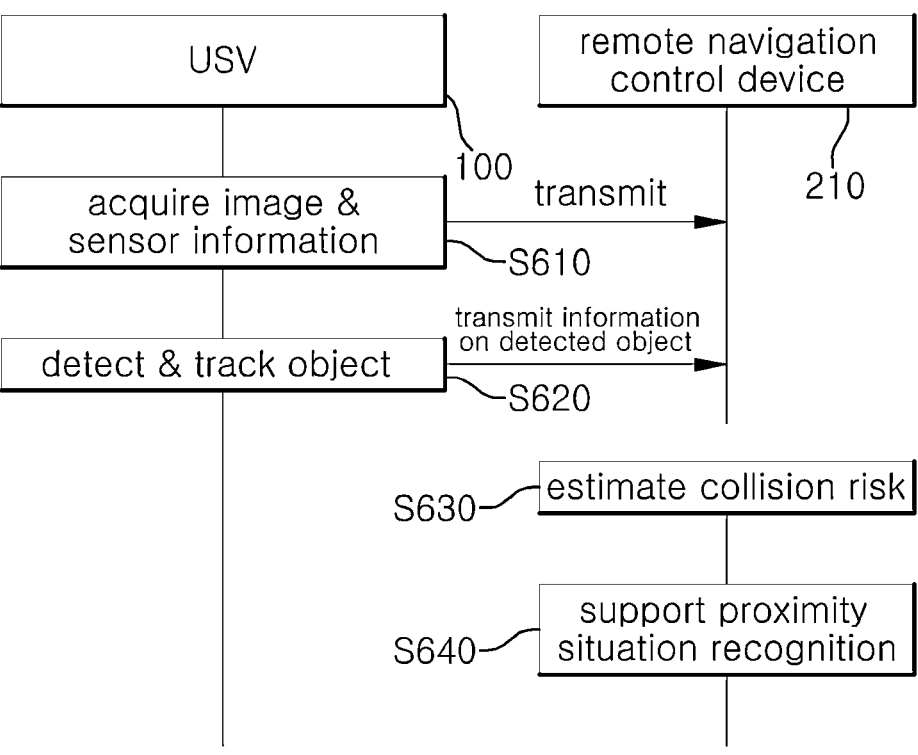
FIG. 6 is a flowchart schematically illustrating an operating method of a system for multi-image-based vessel proximity situation recognition support according to the embodiment of the present disclosure.

FIG. 6 is a flowchart schematically illustrating an operating method of a system for multi-image-based vessel proximity situation recognition support according to the embodiment of the present disclosure.

In the step of S610, the unmanned surface vehicle 100 acquires multiple images of the surroundings by utilizing the image acquisition unit 130 and the navigation sensor unit 140, obtains current navigation information of the unmanned surface vehicle 100 and information on obstacles around the unmanned surface vehicle 100 in real time, and transmits the acquired multi-image information, current navigation information, and obstacle information to the remote navigation control device 210.

In the step of S620, the unmanned surface vehicle 100 monitors the surroundings using multiple images, current navigation information, and obstacle information, and as a result of monitoring, when an object close to the surrounding area within a preset distance is detected, the unmanned surface vehicle 100 tracks the detected object.

At this time, in case the object is detected, the unmanned surface vehicle 100 may also transmit information on the detected object to the remote navigation control device 210.

In the step of S630, the remote navigation control device 210 estimates a collision risk between the unmanned surface vehicle 100 and the object around the unmanned surface vehicle 100 detected by the detection unit 150 by using the multiple-image information, obstacle information, and current navigation information received from the unmanned surface vehicle 100.

In the step of S640, the remote navigation control device 210 displays the estimated collision risk along with the object on the electronic navigational chart for each detected object and outputs the displayed collision risk in order to support the remote operator's awareness of the surrounding situations of the unmanned surface vehicle 100.

In addition, the remote navigation control device 210 may display and output the calculated collision risk for the detected object displayed on the augmented reality or virtual reality screen based on the multiple images showing the surroundings of the unmanned surface vehicle 100 in order to support the remote operator's awareness of the surrounding situations of the unmanned surface vehicle 100.

Meanwhile, components of the above-described embodiment may be easily grasped from a process perspective. That is, each component may be identified as a separate process. In addition, the process of the above-described embodiment may be easily grasped from the point of view of components of the device.

Furthermore, the technical contents described above may be implemented in the form of program instructions that can be executed through various computer means and recorded in a computer-readable medium. The computer-readable medium may include program instructions, data files, data structures, etc., or a combination thereof. The program instructions recorded on the medium may be specially designed and configured for the embodiments or may be known and usable to those skilled in the art of computer software. Examples of computer-readable medium include magnetic storage media such as hard disks, floppy disks, and magnetic tapes, optical media such as CD-ROM and DVD, magneto-optical media, such as floptical disks, a hardware device specially configured to store and execute program instructions, such as ROM, RAM, flash memory, etc. Examples of the program instructions include high-level language codes that can be executed by a computer using an interpreter, as well as machine language codes such as those produced by a compiler. The hardware device may be configured to act as one or more software modules to perform the operations of the embodiments and vice versa.

The foregoing embodiments of the present disclosure have been disclosed for purposes of illustration. Those skilled in the art with ordinary knowledge of the present disclosure will be able to make various modifications, changes, and additions within the spirit and scope of the present disclosure, and these modifications, changes, and additions should be regarded as belonging to the scope of the following claims.

What is claimed is:

1. A system for multi-image-based vessel proximity situation information support, the system comprising:

an unmanned surface vehicle (USV) configured to detect and track surrounding objects by monitoring surroundings using surrounding images and navigation sensors; and a remote navigation controller configured to support proximity situation information of the unmanned surface vehicle according to detection of the surrounding objects, wherein the unmanned surface vehicle comprises:

an image acquisition processor configured to acquire multiple images showing the surroundings of the unmanned surface vehicle to detect objects around the unmanned surface vehicle through image analysis;

a navigation sensor configured to acquire current navigation information of the unmanned surface vehicle and information on obstacles around the unmanned surface vehicle in real time; and a detector configured to monitor the surroundings of the unmanned surface vehicle by using the multiple images, current navigation information, and information on obstacles and, when an object close to the unmanned surface vehicle within a preset distance is detected as a result of monitoring, track the object detected, the detector further configured to detect and track one or more additional moving objects within the preset distance, wherein the remote navigation controller comprises:

an estimation processor configured to estimate a collision risk between the unmanned surface vehicle and the object detected by using the multiple images, current navigation information, and information on obstacles; and a situation information processor configured to display the collision risk estimated, along with the object detected, on an electronic navigational chart for each detected object and to output the collision risk in order to support proximity situation information, wherein the estimation processor is configured to:

determine whether the object detected is located on an expected path of the unmanned surface vehicle by using the current navigation information, based on determining that the object detected is located on the expected path, calculate the collision risk between the unmanned surface vehicle and the object detected, by using fuzzy inference, and based on determining that the detected object is identified as a moving object, calculate a time when the detected moving object passes through the expected path of the unmanned surface vehicle, and calculate the collision risk between the unmanned surface vehicle and the detected moving object at the time of passing through the calculated predicted path by the detected moving object, by using fuzzy inference, and wherein the remote navigation controller is configured to:

determine that the distance between the unmanned surface vehicle and the detected moving object is less than a distance between the unmanned surface vehicle and any of the detected one or more additional moving objects, calculate collision risks between the unmanned surface vehicle and the detected one or more additional moving objects, determine that the collision risk between the unmanned surface vehicle and the detected moving object is higher than any of the collision risks between the unmanned surface vehicle and the detected one or more additional moving objects, determine the detected moving object to have a high risk of collision, display the detected moving object with a warning sign indicating a collision danger, display the calculated collision risk on an augmented reality or virtual reality screen based on the multiple images showing the surroundings of the unmanned surface vehicle to support a remote operator's awareness, determine that the detected object is located on the expected path of the unmanned surface vehicle based on the current navigation information including all of the location, speed, direction, and posture of the unmanned surface vehicle, and transmit control commands and control information to the unmanned surface vehicle to adjust at least one of a speed or a direction of the unmanned surface vehicle to avoid a collision between the unmanned surface vehicle and the detected moving object such that the unmanned surface vehicle is controlled by the control commands and control information received from the remote navigation controller.

2. The system for multi-image-based vessel proximity situation information support of claim 1, wherein the image acquisition processor includes a thermal imaging camera, a panoramic camera, and a 360-degree camera installed to photograph the surroundings of the unmanned surface vehicle, and wherein the image acquisition processor is configured to acquire the multiple images including thermal images, panoramic images, and 360-degree images of the surroundings of the unmanned surface vehicle in a form of Around View (AV).

3. The system for multi-image-based vessel proximity situation information support of claim 1, wherein the navigation sensor includes a global positioning system (GPS), a gyro sensor, an automatic identification system (AIS), and RADAR, wherein the GPS and gyro sensor are configured to obtain the current navigation information including location, speed, direction, and posture of the unmanned surface vehicle, while the AIS and RADAR obtain the information on obstacles around the unmanned surface vehicle.

4. The system for multi-image-based vessel proximity situation information support of claim 1, wherein the situation information processor is configured to display the collision risk for the object detected in an augmented reality (AR) or virtual reality (VR) screen based on the multiple images and outputs the screen in order to support the proximity situation information.

5. A method for multi-image-based vessel proximity situation information support performed in a system including an unmanned surface vehicle and a remote navigation control device, the method comprising:

acquiring, by the unmanned surface vehicle, multiple images of surroundings to detect surrounding objects through image analysis;

obtaining, by the unmanned surface vehicle, current navigation information and information on surrounding obstacles in real time;

monitoring, by the unmanned surface vehicle, the surroundings using the multiple images, current navigation information, and information on surrounding obstacles and, when an object close to a surrounding area within a preset distance is detected as a result of monitoring, tracking the object detected, the monitoring comprising detecting and tracking one or more additional moving objects within the preset distance;

supporting, by the remote navigation control device, proximity situation information of the unmanned surface vehicle according to detection of the object;

estimating, by an estimation processor of the remote navigation control device, a collision risk between the unmanned surface vehicle and the object detected by using the multiple images, current navigation information, and information on obstacles;

displaying, by a situation information processor of the remote navigation control device, the collision risk estimated, along with the object detected, on an electronic navigational chart for each detected object and to output the collision risk in order to support proximity situation information;

determining, by the estimation processor, whether the object detected is located on an expected path of the unmanned surface vehicle by using the current navigation information;

based on determining that the object detected is located on the expected path, calculating, by the estimation processor, the collision risk between the unmanned surface vehicle and the object detected, by using fuzzy inference;

based on determining that the detected object is identified as a moving object, calculating, by the estimation processor, a time when the detected moving object passes through the expected path of the unmanned surface vehicle, and calculating the collision risk between the unmanned surface vehicle and the detected moving object at the time of passing through the calculated predicted path by the detected moving object, by using fuzzy inference;

determining, by the remote navigation control device, that the distance between the unmanned surface vehicle and the detected moving object is less than a distance between the unmanned surface vehicle and any of the detected one or more additional moving objects;

calculating, by the remote navigation control device, collision risks between the unmanned surface vehicle and the detected one or more additional moving objects;

determining, by the remote navigation control device, that the collision risk between the unmanned surface vehicle and the detected moving object is higher than any of the collision risks between the unmanned surface vehicle and the detected one or more additional moving objects;

determining, by the remote navigation control device, the detected moving object to have a high risk of collision;

displaying, by the remote navigation control device, the detected moving object with a warning sign indicating a collision danger, displaying the calculated collision risk on an augmented reality or virtual reality screen based on the multiple images showing the surroundings of the unmanned surface vehicle to support a remote operator's awareness;

determining that the detected object is located on the expected path of the unmanned surface vehicle based on the current navigation information including all of the location, speed, direction, and posture of the unmanned surface vehicle; and transmitting, by the remote navigation control device, control commands and control information to the unmanned surface vehicle to adjust at least one of a speed or a direction of the unmanned surface vehicle to avoid a collision between the unmanned surface vehicle and the detected moving object such that the unmanned surface vehicle is controlled by the control commands and control information received from the remote navigation control device.

\* \* \* \* \*